US012125621B2

(12) United States Patent
Okumura et al.

(10) Patent No.: US 12,125,621 B2
(45) Date of Patent: Oct. 22, 2024

(54) INDUCTOR

(71) Applicant: NITTO DENKO CORPORATION, Osaka (JP)

(72) Inventors: Keisuke Okumura, Osaka (JP); Yoshihiro Furukawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 613 days.

(21) Appl. No.: 17/437,668

(22) PCT Filed: Feb. 5, 2020

(86) PCT No.: PCT/JP2020/004250
§ 371 (c)(1),
(2) Date: Sep. 9, 2021

(87) PCT Pub. No.: WO2020/184000
PCT Pub. Date: Sep. 17, 2020

(65) Prior Publication Data
US 2022/0165465 A1 May 26, 2022

(30) Foreign Application Priority Data
Mar. 12, 2019 (JP) ................................ 2019-044776

(51) Int. Cl.
*H01F 1/24* (2006.01)
*H01F 17/00* (2006.01)
(Continued)

(52) U.S. Cl.
CPC ........... *H01F 1/24* (2013.01); *H01F 17/0006* (2013.01); *H01F 17/04* (2013.01);
(Continued)

(58) Field of Classification Search
None
See application file for complete search history.

(56) References Cited

U.S. PATENT DOCUMENTS 6,392,525 B1 5/2002 Kato et al.
10,546,680 B2 * 1/2020 Park ........................ H01F 17/04
(Continued)

FOREIGN PATENT DOCUMENTS

EP 2 963 094 A1 1/2016
JP S48-088475 U 10/1973
(Continued)

OTHER PUBLICATIONS

International Search Report Issued in PCT/JP2020/004250 on Apr. 21, 2020.
(Continued)

*Primary Examiner* — Kevin M Bernatz
(74) *Attorney, Agent, or Firm* — Edwards Neils LLC; Jean C. Edwards, Esq.

(57) ABSTRACT

An inductor includes a wire including a conducting line, and an insulating film disposed on an entire circumferential surface of the conducting line, and a magnetic layer embedding the wire. The magnetic layer contains a magnetic particle. The magnetic layer includes a first layer in contact with the circumferential surface of the wire, a second layer in contact with the surface of the first layer, . . . and the n-th layer (n is a positive number of 3 or more) in contact with the surface of the (n−1)th layer. In the two layers adjacent to each other in the magnetic layer, the relative magnetic
(Continued)

1 permeability of the layer closer to the wire is lower than the relative magnetic permeability of the layer farther from the wire.

6 Claims, 8 Drawing Sheets

(51) Int. Cl.
*H01F 17/04* (2006.01)
*H01F 27/28* (2006.01)

(52) U.S. Cl.
CPC . *H01F 27/2823* (2013.01); *H01F 2017/0066* (2013.01); *H01F 2017/048* (2013.01); *Y10T 428/32* (2015.01)

(56) References Cited

U.S. PATENT DOCUMENTS

| | | | | |
|---|---|---|---|---|
| 11,508,507 | B2 * | 11/2022 | Okumura | H01F 5/003 |
| 11,948,720 | B2 * | 4/2024 | Furukawa | H01F 1/12 |
| 2009/0002117 | A1 * | 1/2009 | Kawarai | H01F 17/0006 336/233 |
| 2010/0253463 | A1 | 10/2010 | Shimomura et al. | |
| 2015/0371752 | A1 * | 12/2015 | Park | H01F 27/255 336/200 |
| 2016/0141739 | A1 | 5/2016 | Yosui | |
| 2016/0343498 | A1 * | 11/2016 | Lee | H01G 4/005 |
| 2019/0180909 | A1 * | 6/2019 | Shinohara | H01F 27/292 |
| 2022/0165483 | A1 * | 5/2022 | Okumura | H01F 1/28 |

FOREIGN PATENT DOCUMENTS

| | | | |
|---|---|---|---|
| JP | S62-169407 | A | 7/1987 |
| JP | H10-144526 | A | 5/1998 |
| JP | H11-040979 | A | 2/1999 |
| JP | 2001-185421 | A | 7/2001 |
| JP | 2009-009985 | A | 1/2009 |
| JP | 2014-165363 | A | 9/2014 |
| JP | 2017-005115 | A | 1/2017 |
| JP | 2018-092092 | A | 6/2018 |
| WO | 2009/075110 | A1 | 6/2009 |
| WO | 2015/119004 | A1 | 8/2015 |

OTHER PUBLICATIONS

Written Opinion Issued in PCT/JP2020/004250 on Apr. 21, 2020.
Office Action, issued by the Japanese Patent Office on May 30, 2023, in connection with Japanese Patent Application No. 2019-044776.
International Preliminary Report on Patentability issued by WIPO on Aug. 25, 2021, in connection with International Patent Application No. PCT/JP2020/004250.
Office Action, issued by the Korean Intellectual Property Office on Jun. 11, 2024, in connection with Korean Patent Application No. 10-2021-7028619.

* cited by examiner

INDUCTOR

CROSS-REFERENCE TO RELATED APPLICATIONS

The present application is a 35 U.S.C. 371 National Stage Entry PCT/JP2020/004250, filed on Feb. 5, 2020, which claims priority from Japanese Patent Application No. 2019-044776, filed on Mar. 12, 2019, the contents of all of which are herein incorporated by reference in their entirety.

TECHNICAL FIELD

The present invention relates to an inductor.

BACKGROUND ART

Conventionally, it has been known that an inductor is loaded on an electronic device and the like to be used as a passive element for a voltage conversion member and the like.

For example, an inductor including a rectangular parallelepiped chip body portion made of a magnetic material, and an inner conductor made of copper embedded in the interior of the chip body portion has been proposed (ref: for example, Patent Document 1 below).

CITATION LIST

Patent Document

Patent Document 1: Japanese Unexamined Patent Publication No. H10-144526

SUMMARY OF THE INVENTION

Problem to be Solved by the Invention

However, in the inductor of Patent Document 1, there is a problem that the DC superposition characteristics are insufficient.

The present invention provides an inductor having excellent DC superposition characteristics.

Means for Solving the Problem

The present invention (1) includes an inductor including a wire including a conducting line, and an insulating film disposed on an entire circumferential surface of the conducting line, and a magnetic layer embedding the wire, wherein the magnetic layer contains a magnetic particle, the magnetic layer includes a first layer in contact with the circumferential surface of the wire, a second layer in contact with the surface of the first layer, and the n-th layer (n is a positive number of 3 or more) in contact with the surface of the (n−1)th layer, and in the two lasers adjacent to each other in the magnetic layer, the relative magnetic permeability of the layer closer to the wire is lower than the relative magnetic permeability of the layer farther from the wire.

The present invention (2) includes the inductor described in (1), wherein the wire has a generally circular shape in a cross-sectional view.

The present invention (3) includes the inductor described in (2), wherein any of the second layer to the n-th layer has a generally arc shape in a cross-sectional view sharing a center with the wire.

The present invention (4) includes the inductor described in any one of (1) to (3), wherein any of the first layer to the n-th layer has an extending portion extending from the wire in a direction perpendicular to an extending direction of the wire and a thickness direction of the magnetic layer.

The present invention (5) includes the inductor described in any one of (1) to (4), wherein the magnetic particle contained in the first layer has a generally spherical shape, and the magnetic particle contained in the second layer to the n-th layer has a generally flat shape.

The present invention (6) includes the inductor described in any one of (1) to (5), wherein the magnetic particle contained in at least the second layer is orientated in an outer peripheral surface of the wire.

Effect of the Invention

The inductor of the present invention has excellent DC superposition characteristics.

DESCRIPTION OF EMBODIMENTS

<One Embodiment>

One embodiment of an inductor of the present invention is described with reference to FIG. 1.

<Basic Embodiment of Inductor>

Figure 1:
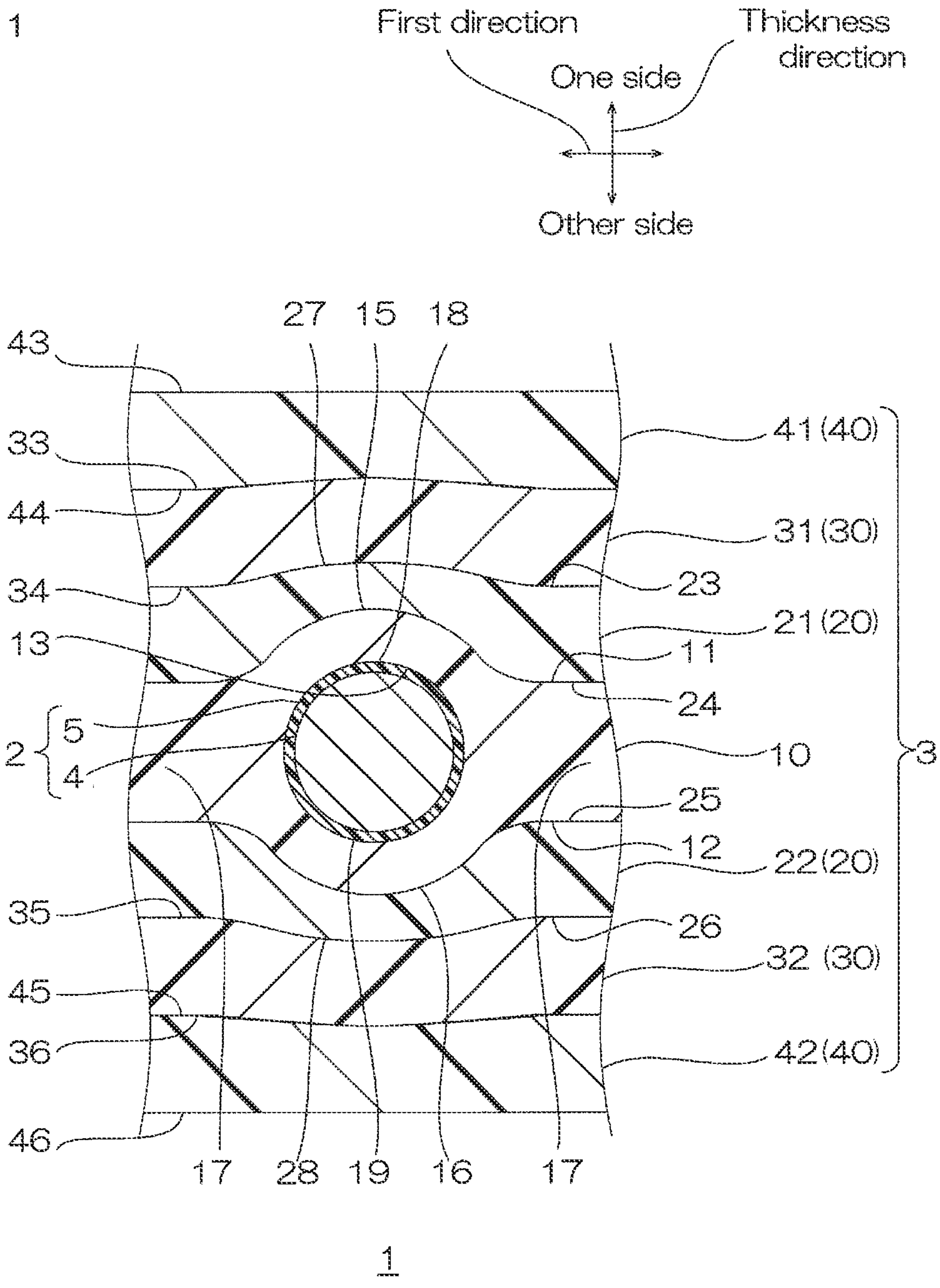
FIG. 1 shows a front cross-sectional view of one embodiment of an inductor of the present invention.

As shown in FIG. 1, an inductor 1 has a shape extending in a plane direction. Specifically, the inductor 1 has one surface and the other surface facing each other in a thickness direction, both one surface and the other surface have a flat shape along a first direction perpendicular to a direction which is included in the plane direction and in which a wire 2 (described later) transmits an electric current (corresponding to the depth direction on the plane of the sheet) and the thickness direction.

The inductor 1 includes the wire 2, and a magnetic layer 3.

<Wire>

The wire 2 has a generally circular shape in a cross-sectional view. Specifically, the wire 2 has a generally circular shape when cut in a cross-section (cross-section in the first direction) perpendicular to a second direction (transmission direction) (depth direction on the plane of the sheet) which is a direction for transmitting the electric current.

The wire 2 includes a conducting line 4, and an insulating film 5 covering it.

The conducting line 4 is a conducting line having a shape extending long in the second direction. Further, the conducting line 4 has a generally circular shape in a cross-sectional view sharing a central axis with the wire 2.

Examples of a material for the conducting line 4 include metal conductors such as copper, silver, gold, aluminum, nickel, and an alloy of these, and preferably, copper is used. The conducting line 4 may have a single-layer structure, or a multi-layer structure in which plating (for example, nickel) is applied to the surface of a core conductor (for example, copper).

A radius of the conducting line 4 is, for example, 25 μm or more, preferably 50 μm or more, and for example, 2000 μm or less, preferably 200 μm or less.

The insulating film 5 protects the conducting line 4 from chemicals and water, and also prevents a short circuit of the conducting line 4 with the magnetic layer 3. The insulating film 5 covers the entire outer peripheral surface (circumferential surface) of the conducting line 4

The insulating film 5 has a generally circular ring shape in a cross-sectional view sharing a central axis (center) with the wire 2.

Examples of a material for the insulating film 5 include insulating resins such as poly vinyl formal, polyester, polyesterimide, polyamide (including nylon), polyimide, polyamideimide, and polyurethane. These may be used alone or in combination of two or more.

The insulating film 5 may consist of a single layer or a plurality of layers.

A thickness of the insulating film 5 is generally uniform in a radial direction of the wire 2 at any position in a circumferential direction, and is, for example, 1 μm or more, preferably 3 μm or more, and for example, 100 μm or less, preferably 50 μm or less.

A ratio of a radius of the conducting line 4 to the thickness of the insulating film 5 is, for example, 1 or more, preferably 5 or more, and for example, 500 or less, preferably 100 or less.

A radius R (=the total sum of the radius of the conducting line 4 and the thickness of the insulating film 5) of the wire 2 is, for example, 25 μm or more, preferably 50 μm or more, and for example, 2000 μm or less, preferably 200 μm or less.

<Outline of Magnetic Layer (Layer Configuration, Shape, etc.)>

The magnetic layer 3 improves the DC superposition characteristics of the inductor 1, while improving the inductance of the inductor 1. The magnetic layer 3 covers the entire outer peripheral surface (circumferential surface) of the wire 2. Thus, the magnetic layer 3 embeds the wire 2. The magnetic layer 3 forms the outer shape of the inductor 1. Specifically, the magnetic layer 3 has a rectangular shape extending in the plane direction (the first direction and the second direction). More specifically, the magnetic layer 3 has one surface and the other surface facing each other in the thickness direction, and one surface and the other surface of the magnetic layer 3 form one surface and the other surface of the inductor 1, respectively.

The magnetic layer 3 includes a first layer 10 embedding the wire 2, a second layer 20 in contact with the surface of the first layer 10, a third layer 30 in contact with the surface of the second layer 20, and a fourth layer 40 in contact with the surface of the third layer 30.

Further, at a position overlapped with the wire 2 (overlapped position), the first layer 10, the second layer 20, the third layer 30, and the fourth layer 40 are arranged from the wire 2 toward both sides in the thickness direction. In a projected surface projected in the thickness direction, at a position deviated from the wire 2 in the first direction, the first layer 10, the second layer 20, the third layer 30, and the fourth layer 40 are arranged from an intermediate portion (central portion) in the thickness direction of the magnetic layer 3 toward both sides in the thickness direction.

The first layer 10 has a shape extending in the plane direction, and has one surface 11 and an other surface 12 facing each other in the thickness direction. Further, the first layer 10 covers the entire outer peripheral surface (circumferential surface) of the insulating film 5. Thus, the first layer 10 embeds the insulating film 5. Therefore, the first layer 10 further has an inner peripheral surface 13 in contact with the outer peripheral surface of the insulating film 5.

The first layer 10 includes a generally arc shape in a cross-sectional view sharing the center with the wire 2. Specifically, the first layer 10 integrally has a one-side first arc portion 15, an other-side first arc portion 16, and an extending portion 17 in a cross-sectional view.

The one-side first arc portion 15 is disposed at one side in the thickness direction from the center of the wire 2. The one-side first arc portion 15 faces a one-side area 18 at one side in the thickness direction from the center of the wire 2 on the circumferential surface of the wire 2 in a cross-sectional view. The one surface 11 of the one-side first are portion 15 forms an arc surface sharing the center with the wire 2. A central angle of the one-side first arc portion 15 is, for example, below 180 degrees, preferably 135 degrees or less, and for example, 30 degrees or more, preferably 60 degrees or more.

The other-side first are portion 16 faces an other-side area 19 at the other side in the thickness direction from the center of the wire 2 on the circumferential surface of the wire 2 in a cross-sectional view. The other surface 12 of the other-side first are portion 16 forms an arc surface sharing the center with the wire 2. A central angle of the other-side first arc portion 16 is, for example, below 180 degrees, preferably 135 degrees or less, and for example, 30 degrees or more, preferably 60 degrees or more.

The central angle of the total sum of the one-side first arc portion 15 and the other-side first arc portion 16 is, for example, below 360 degrees.

The other-side first are portion 16 is plane-symmetrical with the one-side first are portion 15 with respect to a phantom plane passing the center of the wire 2 along the plane direction.

The extending portion 17 has a shape extending from the wire 2 outwardly in the first direction. The two extending portions 17 are provided in the first layer 10. Each of the two extending portions 17 is disposed at each of both outer sides in the first direction of the wire 2. Each of the two extending portions 17 extends outwardly in the first direction from the circumferential surface of the wire 2 between the one-side first arc portion 15 and the other-side first arc portion 16 to reach each of both end surfaces in the first direction of the inductor 1. The one surface 11 and the other surface 12 in the extending portion 17 are parallel. The extending portion 17 has two flat belt shapes extending in the second direction at both outer sides in the first direction of the wire 2 when viewed from the top.

A thickness of each of the one-side first arc portion 15 and the other-side first arc portion 16 is, for example, 1 μm or more, preferably 5 μm or more, and for example, 1000 μm or less, preferably 800 μm or less. A thickness of the extending portion 17 is, for example, 2 μm or more, preferably 10 μm or more, and for example, 2000 μm or less, preferably 1600 μm or less.

The thickness of the first layer 10 corresponds to the total thickness of the one-side first are portion 15 and the other-side first arc portion 16, and also corresponds to the thickness of the extending portion 17. Specifically, the thickness of the first layer 10 is, for example, 2 μm or more, preferably 10 μm or more, and for example, 2000 μm or less, preferably 1600 μm or less, more preferably 100 μm or less, further more preferably 500 μm or less.

A ratio of the thickness of the first layer 10 to the thickness (described later) of the magnetic layer 3 is, for example, 0.01 or more, preferably 0.05 or more, more preferably 0.1 or more, further more preferably 0.2 or more, particularly preferably 0.3 or more, and for example, 0.5 or less, preferably 0.4 or less.

When the ratio of the thickness of the first layer 10 to that of the magnetic layer 3 is the above-described lower limit or more, a sufficient distance between the second laser 20 and the wire 2 is ensured, and the magnetic saturation of the second layer 20, the third layer 30, and the fourth layer 40 is suppressed, that is, a layer having higher relative magnetic permeability can be disposed after the second layer 20, while maintaining excellent DC superposition characteristics.

The second layer 20 independently has a one-side second layer 21 and an other-side second layer 22.

The one-side second layer 21 is in contact with the one surface 11 of the first layer 10. The one-side second layer 21 has a shape following the one surface 11 of the one-side first arc portion 15 and the two extending portions 17 of the first layer 10. The one-side second layer 21 has an other surface 24 in contact with the one surface 11 of the first layer 10, and one surface 23 disposed at one side in the thickness direction of the other surface 24 at spaced intervals thereto. The one-side second layer 21 has a one-side second arc portion 27 in a generally arc shape in a cross-sectional view sharing the center with the wire 2.

The other-side second layer 22 is oppositely disposed at the other side in the thickness direction of the one-side second layer 21 across the first layer 10. The other-side second layer 22 is in contact with the other surface 12 of the first laver 10. The other-side second layer 22 has a shape following the other surface 12 of the other-side first arc portion 16 and the two extending portions 17 of the first layer 10. The other-side second layer 22 has one surface 25 in contact with the other surface 12 of the first layer 10, and an other surface 26 disposed at the other side in the thickness direction of the one surface 25 at spaced intervals thereto. The other-side second layer 22 has an other-side second arc portion 28 in a generally arc shape in a cross-sectional view sharing the center with the wire 2.

The other-side second layer 22 is plane-symmetrical with the one-side second layer 21 with respect to a phantom plane passing the center of the wire 2 along the plane direction.

A thickness of the second layer 20 is the total thickness of the one-side second layer 21 and the other-side second layer 22, and is, for example, 1 μm or more, preferably 5 μm or more, and for example, 1000 μm or less, preferably 800 μm or less.

A ratio of the thickness of the second layer 20 to the thickness (described later) of the magnetic layer 3 is, for example, 0.01 or more, preferably 0.05 or more, and for example, 0.5 or less, preferably 0.4 or less.

A ratio of the thickness of the second layer 20 to the thickness of the first layer 10 is, for example, 0.1 or more, preferably 0.2 or more, and for example, 100 or less, preferably 10 or less.

The third layer 20 independently has a one-side third layer 31 and an other-side third layer 32.

The one-side third layer 31 is in contact with the one-side second layer 21. Further, the one-side third layer 31 has generally the same thickness over the first direction. The one-side third layer 31 has an other surface 34 in contact with the one surface 23 of the one-side second layer 21, and one surface 33 oppositely disposed at one side in the thickness direction of the other surface 34 at spaced intervals thereto. The one-side third layer 31 has a shape extending in the plane direction.

The other-side third layer 32 is oppositely disposed at the other side in the thickness direction of the one-side third layer 31 across the first layer 1*o* and the second layer 20. The other-side third layer 32 has generally the same thickness over the first direction. The other-side third layer 32 has one surface 35 in contact with the other surface 26 of the other-side second layer 22, and an other surface 36 oppositely disposed at the other side in the thickness direction of the one surface 35 at spaced intervals thereto. The other-side third layer 32 has a shape extending in the plane direction.

The other-side third layer 32 is plane-symmetrical with the one-side third layer 31 with respect to a phantom plane passing the center of the wire 2 along the plane direction.

A thickness of the third layer 30 is the total thickness of the one-side third layer 31 and the other-side third layer 32, and is, for example, 1 μm or more, preferably 5 μm or more, and for example, 1000 μm or less, preferably 800 μm or less.

A ratio of the thickness of the third layer 30 to the thickness of the magnetic laver 3 is, for example, 0.01 or more, preferably 0.05 or more, and for example, 0.5 or less, preferably 0.4 or less.

A ratio of the thickness of the third layer 30 to the thickness of the second layer 20 is, for example, 0.1 or more, preferably 0.2 or more, and for example, 100 or less, preferably 10 or less.

The fourth layer 40 independently has a one-side fourth layer 41 and an other-side fourth layer 42.

The one-side fourth layer 41 is in contact with the one-side third layer 31. Further, the one-side fourth layer 41 has generally the same thickness over the first direction. The one-side fourth layer 41 has an other surface 44 in contact with the one surface 33 of the one-side third layer 31, and one surface 43 oppositely disposed at one side in the thickness direction of the other surface 44 at spaced intervals thereto. The one surface 43 of the one-side fourth layer 41 is exposed toward one side in the thickness direction. The one surface 43 has a flat surface along the first direction and the second direction.

The other-side fourth layer 42 is oppositely disposed at the other side in the thickness direction of the one-side fourth layer 41 across the first layer 10, the second layer 20, and the third layer 30. The other-side fourth layer 42 has generally the same thickness over the first direction. The other-side fourth layer 42 is in contact with the other-side third layer 32. The other-side fourth layer 42 has one surface 45 in contact with the other surface 36 of the other-side third layer 32, and an other surface 46 oppositely disposed with respect to the one surface 45 at spaced intervals thereto. The other surface 46 is exposed toward the other side in the thickness direction. The other surface 46 has a flat surface along the first direction and the second direction.

A thickness of the fourth layer 40 is the total thickness of the one-side fourth layer 41 and the other-side fourth layer 42, and is, for example, 1 μm or more, preferably 5 μm or more, and for example, 1000 μm or less, preferably 800 μm or less.

A ratio of the thickness of the fourth layer 42 to the thickness of the magnetic layer 3 is, for example, 0.01 or more, preferably 0.05 or more, and for example, 0.5 or less, preferably 0.4 or less.

A ratio of the thickness of the fourth layer 40 to the thickness of the third layer 30 is, for example, 0.1 or more, preferably 0.2 or more, and for example, 100 or less, preferably 10 or less.

The thickness of the magnetic layer 3 is the total thickness of the first layer 10, the second layer 20, the third layer 30, and the fourth layer 40, and is, for example, 2 times or more, preferably, 3 times or more, and for example, 20 times or less the radius of the wire 2. Specifically, the thickness of the magnetic layer 3 is, for example, 100 μm or more, preferably 200 μm or more, and for example, 3000 μm or less, preferably 1500 μm or less, more preferably 950 μm or less, further more preferably 900 μm or less, particularly preferably 850 μm or less. The thickness of the magnetic layer 3 is a distance between one surface and the other surface of the magnetic layer 3.

<Relative Magnetic Permeability of Magnetic Layer>

In the first layer 10, the second layer 20, the third layer 30, and the fourth layer 40, in the two layers adjacent to each other, the relative magnetic permeability of the layer closer to the wire 2 is lower than that of the layer farther from the wire 2.

In the magnetic layer 3, for example, by appropriately changing the kind, the shape, and the volume ratio of the magnetic particles of each layer, the relative magnetic permeability of the layer closer to the wire 2 can be set lower than that of the layer farther from the wire 2. An embodiment of the detailed adjustment (formulation) thereof is described in the first embodiment to the second embodiment.

The relative magnetic permeability is measured at a frequency of 10 MHz.

Specifically, the relative magnetic permeability of the first layer 10 is lower than that of the second layer 20. The relative magnetic permeability of the second layer 20 is lower than that of the third layer 30. The relative magnetic permeability of the third layer 30 is lower than that of the fourth layer 40.

Further, in the first layer 10, the second layer 20, the third layer 30, and the fourth layer 40, in the two layers adjacent to each other, a ratio R of the relative magnetic permeability of the layer closer to the wire 2 to that of the layer farther from the wire 2 is, for example, 0.9 or less, preferably 0.7 or less, more preferably 0.5 or less, further more preferably 0.4 or less, particularly preferably 0.3 or less, and for example, 0.01 or more.

Specifically, a ratio R1 (relative magnetic permeability of the first layer 10/relative magnetic permeability of the second layer 20) of the relative magnetic permeability of the first layer 10 to that of the second layer 20 is 0.9 or less, preferably 0.7 or less, more preferably 0.5 or less, further more preferably 0.4 or less, particularly preferably 0.3 or less, and for example, 0.1 or more.

A ratio R2 (relative magnetic permeability of the second layer 20/relative magnetic permeability of the third layer 30) of the relative magnetic permeability of the second layer 20 to that of the third laver 30 is 0.9 or less, preferably 0.88 or less, more preferably 0.85 or less, and for example, 0.1 or more, preferably 0.2 or more, more preferably 0.4 or more, further more preferably 0.5 or more, still more preferably 0.6 or more, particularly preferably 0.7 or more.

A ratio R3 (relative magnetic permeability of the third layer 30/relative magnetic permeability of the fourth layer 40) of the relative magnetic permeability of the third layer 30 to that of the fourth layer 40 is 0.9 or less, preferably 0.8 or less, more preferably 0.75 or less, further more preferably 0.7 or less, and for example, 0.1 or more, preferably 0.2 or more, more preferably 0.3 or more.

The above-described ratios R1 to R3 may be the same or change, and preferably, the ratio R1 is smaller than the ratio R2 and the ratio R2 is smaller than the ratio R3.

A ratio of the ratio R1 to the ratio R2 is, for example, 0.9 or less, preferably 0.8 or less, and for example, 0.2 or more, preferably 0.3 or more, more preferably 0.35 or more.

A ratio of the ratio R2 to the ratio R3 is, for example, 0.8 or less, preferably 0.7 or less, and for example, 0.3 or more, preferably 0.5 or more. Further, in the first layer 10, the second layer 20, the third layer 30, and the fourth layer 40, in the two layers adjacent to each other, a value D obtained by subtracting the relative magnetic permeability of the layer closer to the wire 2 from the relative magnetic permeability of the layer farther from the wire 2 is, for example, 5 or more, preferably 10 or more, more preferably 15 or more, and for example, 100 or less.

Specifically, a value D1 (relative magnetic permeability of the second layer 20—relative magnetic permeability of the first layer 10) obtained by subtracting the relative magnetic permeability of the first layer 10 from the relative magnetic permeability of the second laver 20 is, for example, 5 or more, preferably 10 or more, more preferably 25 or more, and for example, 50 or less.

A value D2 (relative magnetic permeability of the third layer 30—relative magnetic permeability of the second layer 20) obtained by subtracting the relative magnetic permeability of the second layer 20 from the relative magnetic permeability of the third layer 30 is, for example, 5 or more, preferably 10 or more, and for example, 50 or less, preferably 40 or less, more preferably 30 or less.

A value D3 (relative magnetic permeability of the fourth layer 40—relative magnetic permeability of the third layer 30) obtained by subtracting the relative magnetic permeability of the third layer 30 from the relative magnetic permeability of the fourth layer 40 is, for example, 10 or more, preferably 20 or more, and for example, 70 or less.

The above-described values D1 to D3 may be the same or change.

When the ratio R (including R1 to R3) of the relative magnetic permeability and the difference D (subtracted value) (including D1 to D3) described above are the above-described lower limit or more, it is possible to improve the DC superposition characteristics of the inductor 1.

Each layer is defined by the relative magnetic permeability of each layer described above.

Specifically, in the magnetic layer 3, the relative magnetic permeability of a region (region corresponding to the inner peripheral surface 13 of the first layer 10) in contact with the circumferential surface of the wire 2 is measured to be subsequently continuously measured so as to move away from the wire 2, and a region having the same relative magnetic permeability as that first obtained is defined as the first layer 10. This is also carried out for the second layer 20, the third layer 30, and the fourth layer 40 in thus order. That is, a region having the same relative magnetic permeability is defined as one layer. In the description above, the measurement of the relative magnetic permeability is carried out from the inner peripheral surface 13 of the first layer 10.

Alternatively, for example, it can be also carried out from the one surface 43 of the fourth layer 40.

As described later, when each layer is formed of a plurality of magnetic sheets (described later) (ref: phantom line of FIG. 2), in view of the definition described above, the relative magnetic permeability of the plurality of magnetic sheets for forming each layer is the same.

Further, in a producing method to be described later, the relative magnetic permeability of a first sheet 51, a second sheet 52, a third sheet 53, and a fourth sheet 54 for forming the magnetic layer 3 can be measured in advance to be defined as the relative magnetic permeability of the first layer 10, the second layer 20, the third layer 30, and the fourth layer 40, respectively.

<Material for Magnetic Layer>

The magnetic layer 3 contains magnetic particles. Specifically, an example of a material for the magnetic layer 3 includes a magnetic composition containing the magnetic particles and a binder.

Examples of a magnetic material constituting the magnetic particles include a soft magnetic body and a hard magnetic body. Preferably, from the viewpoint of inductance and DC superposition characteristics, a soft magnetic body is used.

Examples of the soft magnetic body include a single metal body containing one kind of metal element in a state of a pure material and an alloy body which is a eutectic (mixture) of one or more kinds of metal element (first metal element) and one or more kinds of metal element (second metal element) and/or non-metal element (carbon, nitrogen, silicon, phosphorus, and the like). These may be used alone or in combination.

An example of the single metal body includes a metal single body consisting of only one kind of metal element (first metal element). The first metal element is, for example, appropriately selected from metal elements that can be included as the first metal element of the soft magnetic body such as iron (Fe), cobalt (Co), nickel (Ni), and the like.

Further, examples of the single metal body include an embodiment including a core including only one kind of metal element and a surface layer including an inorganic material and/or an organic material which modify/modifies a portion of or the entire surface of the core, and an embodiment in which an organic metal compound and an inorganic metal compound including the first metal element are decomposed (thermally decomposed and the like). More specifically, an example of the latter embodiment includes an iron powder (may be referred to as a carbonyl iron powder) in which an organic iron compound (specifically, carbonyl iron) including iron as the first metal element is thermally decomposed. The position of a layer including the inorganic material and/or the organic material modifying a portion including only one kind of metal element is not limited to the above-described surface. The organic metal compound and the inorganic metal compound that can obtain the single metal body are not particularly limited, and can be appropriately selected from a known or conventional organic metal compound and inorganic metal compound that can obtain the single metal body of the soft magnetic body.

The alloy body is not particularly limited as long as it is a eutectic of one or more kinds of metal element (first metal element) and one or more kinds of metal element (second metal element) and/or non-metal element (carbon, nitrogen, silicon, phosphorus, and the like), and can be used as an alloy body of a soft magnetic body.

The first metal element is an essential element in the alloy body, and examples thereof include iron (Fe), cobalt (Co), and nickel (Ni). When the first metal element is Fe, the alloy body is referred to as an Fe-based alloy, when the first metal element is Co, the alloy bods is referred to as a Co-based alloy, and when the first metal element is Ni, the alloy body is referred to as a Ni-based alloy.

The second metal element is an element (sub-component) which is secondarily contained in the alloy body, and is a metal element to be compatible with (eutectic to) the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (H), vanadium (V), niobium (Nb), tantalum (Ta), molybdenum (Mo), tungsten (W), ruthenium (Ru), rhodium (Rh), zinc (Zn), gallium (Ga), indium (In), germanium (Ge), tin (Sn), lead (Pb), scandium (Sc), yttrium (Y), strontium (Sr), and various rare earth elements. These may be used alone or in combination of two or more.

The non-metal element is an element (sub-component) which is secondarily contained in the alloy body and is a non-metal element which is compatible with (eutectic to) the first metal element. Examples thereof include boron (B), carbon (C), nitrogen (N), silicon (Si), phosphorus (P), and sulfur (S) These may be used alone or in combination of two or more.

Examples of the Fe-based alloy which is one example of an alloy body include magnetic stainless steel (Fe—Cr—Al—Si alloy) (including electromagnetic stainless steel), Sendust (Fe—Si—Al alloy) (including Supersendust), permalloy (Fe—Ni alloy), Fe—Ni—Mo alloy, Fe—Ni—Mo—Cu alloy, Fe—Ni—Co alloy, Fe—Cr alloy, Fe—Cr—Al alloy, Fe—Ni—Cr alloy, Fe—Ni—Cr—Si alloy, silicon copper (Fe—Cu—Si alloy), Fe—Si alloy, Fe—Si—B (—Cu—Nb) alloy, Fe—B—Si—Cr alloy, Fe—Si—Cr—Ni alloy, Fe—Si—Cr alloy. Fe—Si—Al—Ni—Cr alloy, Fe—Ni—Si—Co alloy. Fe—N alloy, Fe—C alloy, Fe—B alloy, Fe—P alloy, ferrite (including stainless steel ferrite and further, soft ferrite such as Mn—Mg ferrite. Mn—Zn ferrite, Ni—Zn ferrite, Ni—Zn—Cu ferrite, Cu—Zn ferrite, and Cu—Mg—Zn ferrite), Permendur (Fe—Co alloy). Fe—Co—V alloy, and Fe-based amorphous alloy.

Examples of the Co-based alloy which is one example of an alloy body include Co—Ta—Zr and a cobalt (Co)-based amorphous alloy.

An example of the Ni-based alloy which is one example of an alloy body includes a Ni—Cr alloy.

Preferably, the magnetic material is appropriately selected from these soft magnetic bodies so as to satisfy the above-described relative magnetic permeability of each of the first layer 10, the second layer 20, the third layer 30, and the fourth layer 40.

A shape of the magnetic particles is not particularly limited, and examples thereof include a shape showing anisotropy such as a generally flat shape (plate shape) and a generally needle shape (including a generally spindle (football) shape), and a shape showing isotropy such as a generally spherical shape, a generally granular shape, and a generally massive shape. The shape of the magnetic particles is appropriately selected from the description above so as to satisfy the above-described relative magnetic permeability of each of the first layer 10, the second layer 20, the third layer 30, and the fourth layer 40.

An average value of the maximum length of the magnetic particles is, for example, 0.1 μm or more, preferably 0.5 μm or more, and for example, 200 μm or less, preferably 150 μm or less. The average value of the maximum length of the magnetic particles can be calculated as a neutral particle size of the magnetic particles.

A volume ratio (filling ratio) of the magnetic particles in the magnetic composition is, for example, 10% by volume or more, preferably 20% by volume or more, and for example, 90% by volume or less, preferably 80% by volume or less.

By appropriately changing the kind, the shape, the size, the volume ratio, and the like of the magnetic particles, the relative magnetic permeability of the first layer 10, the second layer 20, the third layer 30, and the fourth layer 40 satisfies a desired relationship.

Examples of the binder include thermoplastic components such as an acrylic resin and thermosetting components such as an epoxy resin composition. The acrylic resin contains, for example, a carboxyl group-containing acrylic acid ester copolymer. The epoxy resin composition contains, for example, an epoxy resin (cresol novolak-type epoxy resin and the like) as a main agent, a curing agent for an epoxy resin (phenol resin and the like), and a curing accelerator for an epoxy resin (imidazole compound and the like).

As the binder, a thermoplastic component and a thermosetting component may be used alone or in combination, and preferably, a thermoplastic component and a thermosetting component are used in combination.

A more detailed formulation of the magnetic composition described above is described in Japanese Unexamined Patent Publication No. 2014-165363 and the like.

<Producing Method of Inductor>

A method for producing the inductor 1 is described with reference to FIG. 2.

To produce the inductor 1, first, the wire 2 is prepared.

Subsequently, the two first sheets 51, the two second sheets 52, the two third sheets 53, and the two fourth sheets 54 are prepared.

By changing the kind, the shape, the volume ratio, and the like of the magnetic particles contained in the first sheet 51, the second sheet 52, the third sheet 53, and the fourth sheet 54, the relative magnetic permeability satisfying any of the following formulas (1) to (3) can be obtained.

Relative Magnetic permeability of the first sheet 51<relative Magnetic permeability of the second sheet 52 (1)

Relative Magnetic permeability of the second sheet 52<relative Magnetic permeability of the third sheet 53 (2)

Relative Magnetic permeability of the third sheet 53<relative Magnetic permeability of the fourth sheet 54 (3)

Specifically, the first sheet 51, the second sheet 52, the third sheet 53, and the fourth sheet 54 containing the magnetic particles are prepared in the above-described formulation to adjust the relative magnetic permeability of the first sheet 51, the second sheet 52, the third sheet 53, and the fourth sheet 54.

The first sheet 51, the second sheet 52, the third sheet 53, and the fourth sheet 54 are magnetic sheets for forming the first layer 10, the second layer 20, the third layer 30, and the fourth layer 40, respectively. Each sheet described above is formed from the above-described magnetic composition into a plate shape extending in the plane direction.

Figure 2:
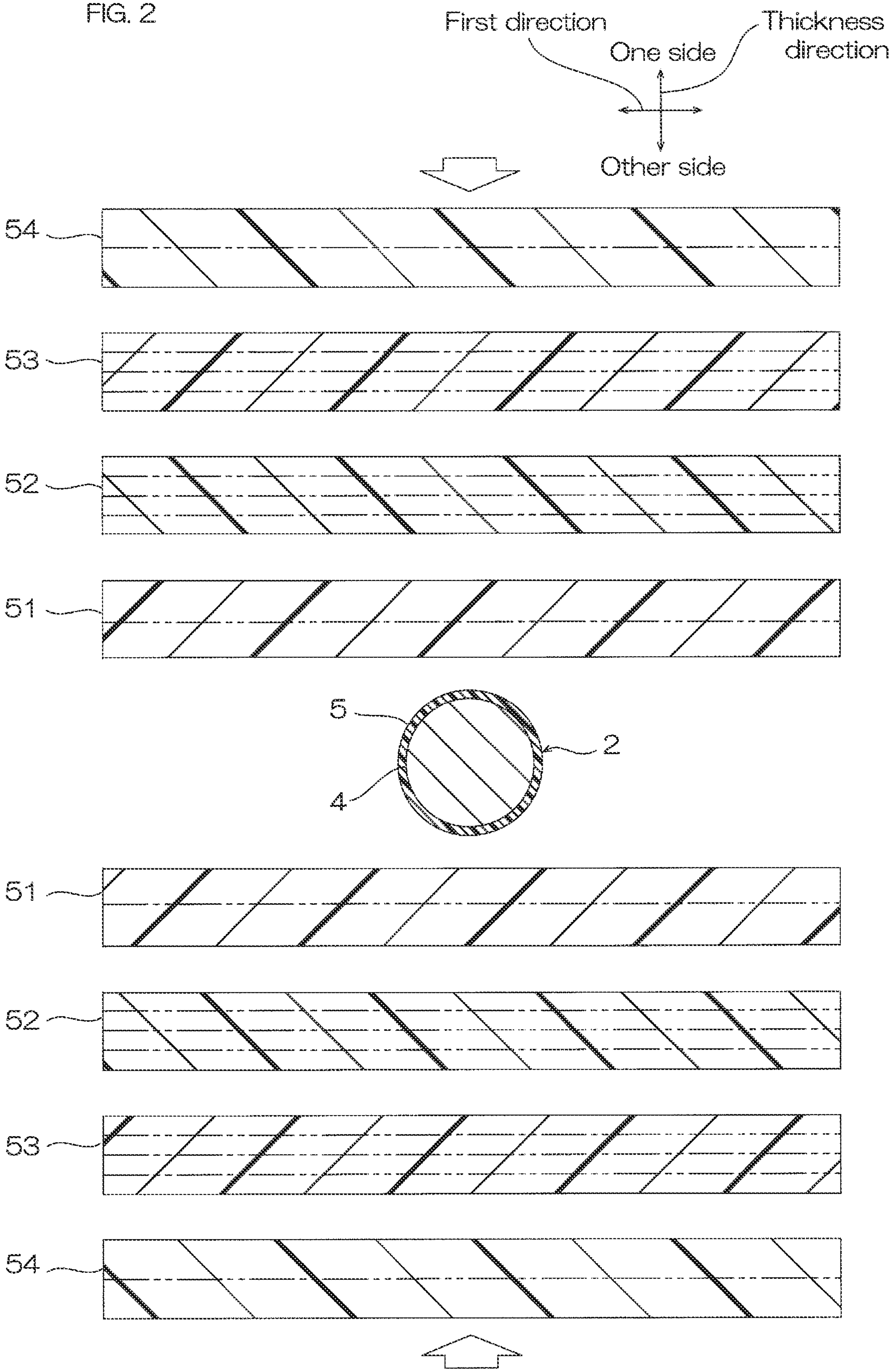
FIG. 2 shows a front cross-sectional view for illustrating a method for producing the inductor shown in FIG. 1.

One of the first sheets 51 may be a single layer, or may consist of a plurality, of layers (two or more layers) in accordance with the application and purpose (ref: phantom line of FIG. 2). The same is applied to the other first sheet 51, and furthermore, each of the second sheets 52, each of the third sheets 53, and each of the fourth sheets 54.

Then, the first sheet 51, the second sheet 52, the third sheet 53, and the fourth sheet 54 are disposed in this order at each of both sides in the thickness direction of the wire 2. Specifically, the two first sheets 51 are disposed so as to sandwich the wire 2 therebetween. The second sheet 52, the third sheet 53, and the fourth sheet 54 are disposed in this order so as to move away from the wire 2 with respect to the first sheet 51.

Specifically, the fourth sheet 54, the third sheet 53, the second sheet 52, the first sheet 51, the wire 2, the first sheet 51, the second sheet 52, the third sheet 53, and the fourth sheet 54 are disposed in order toward one side in the thickness direction.

Subsequently, for example, they are thermally pressed. In the thermal pressing, for example, a flat plate press is used.

Thus, as shown in FIG. 1, the first sheet 51, the second sheet 52, the third sheet 53, and the fourth sheet 54 are deformed to form the first layer 10, the second layer 20, the third layer 30, and the fourth layer 40, respectively.

Specifically, for example, the first sheet 51 is deformed from the plate shape into a shape having the one-side first arc portion 15 and the other-side first arc portion 16 and embedding the wire 2, and thus, the first layer 10 is formed.

The second sheet 52 is deformed from the plate shape into a shape having the one-side second arc portion 27 and the other-side second arc portion 25 and following the one surface 11 and the other surface 12 of the first layer 10, and thus, the second layer 10 is formed.

Further, the third layer 30 and the fourth layer 40 are formed from the third sheet 53 and the fourth sheet 54, respectively.

When the magnetic composition contains a thermosetting component, the magnetic composition is thermally cured by heating at the same time as or after the thermal pressing.

Thus, the magnetic layer 3 embedding the wire 2 is formed.

Thus, the inductor 1 including the wire 2 and the magnetic layer 3, and in which in the first layer 10, the second layer 20, the third layer 30, and the fourth layer 40 of the magnetic layer 3, in the two layers adjacent to each other, the relative magnetic permeability of the layer closer to the wire 2 is lower than that of the layer farther from the wire 2 is produced.

Then, the inductor 1 includes the magnetic layer 3 which has the first laser 10, the second layer 20, the third layer 30, and the fourth layer 40 having the above-described relative magnetic permeability.

Therefore, the inductor 1 has excellent DC superposition characteristics.

This is supposedly because the closer it is to the wire 2, the lower the relative magnetic permeability is, and the magnetic saturation is less likely to occur.

Further, in the inductor 1, since the first layer 10 includes the extending portion 17, the absolute amount of the magnetic particles (filler) contributing to the improvement of the DC superposition characteristics is increased, and therefore, the DC superposition characteristics are improved.

(Modified Examples)

In the modified examples, the same reference numerals are provided for members and steps corresponding to each of those in one embodiment, and their detailed description is omitted. Also, the modified examples can achieve the same function and effect as that of one embodiment unless otherwise specified. Furthermore, one embodiment and the modified examples thereof can be appropriately used in combination.

In the above-described one embodiment, as shown in FIG. 1, the magnetic layer 3 includes the first layer 10 to the fourth laser 40. However, the magnetic layer 3 is not particularly limited as long as it has the n-th layer (n is a positive number of 3 or more), and, for example, though not shown, the magnetic layer 3 may also include the first layer 10 to the third layer 30 (embodiment in which n is 3) without including the fourth layer 40. Further, the magnetic layer 3 may also include the first layer 10 to the fifth layer (embodiment in which n is 5).

Further, in the above-described one embodiment, as shown in FIG. 1, the wire 2 has a generally circular shape in a cross-sectional view. However, the shape thereof in a cross-sectional view is not particularly limited, and though not shown, examples of the shape thereof may also include a generally rectangular shape in a cross-sectional view and a generally elliptical shape in a cross-sectional view.

In one embodiment, the extending portion 17 extends from the circumferential surface of the wire 2 to reach the end surface in the first direction of the inductor 1. Alternatively, for example, though not shown, the extending portion 17 can also extend to an intermediate portion between the circumferential surface of the wire 2 and the end surface in the first direction of the inductor 1 without reaching the end surface in the first direction of the inductor 1 from the circumferential surface of the wire 2.

In one embodiment, the extending portion 17 is provided in the first layer 10. Alternatively, it can be also provided in any layer in the magnetic layer 3, and for example, as shown in FIG. 7, it can be provided in the second layer 20.

Figure 7:
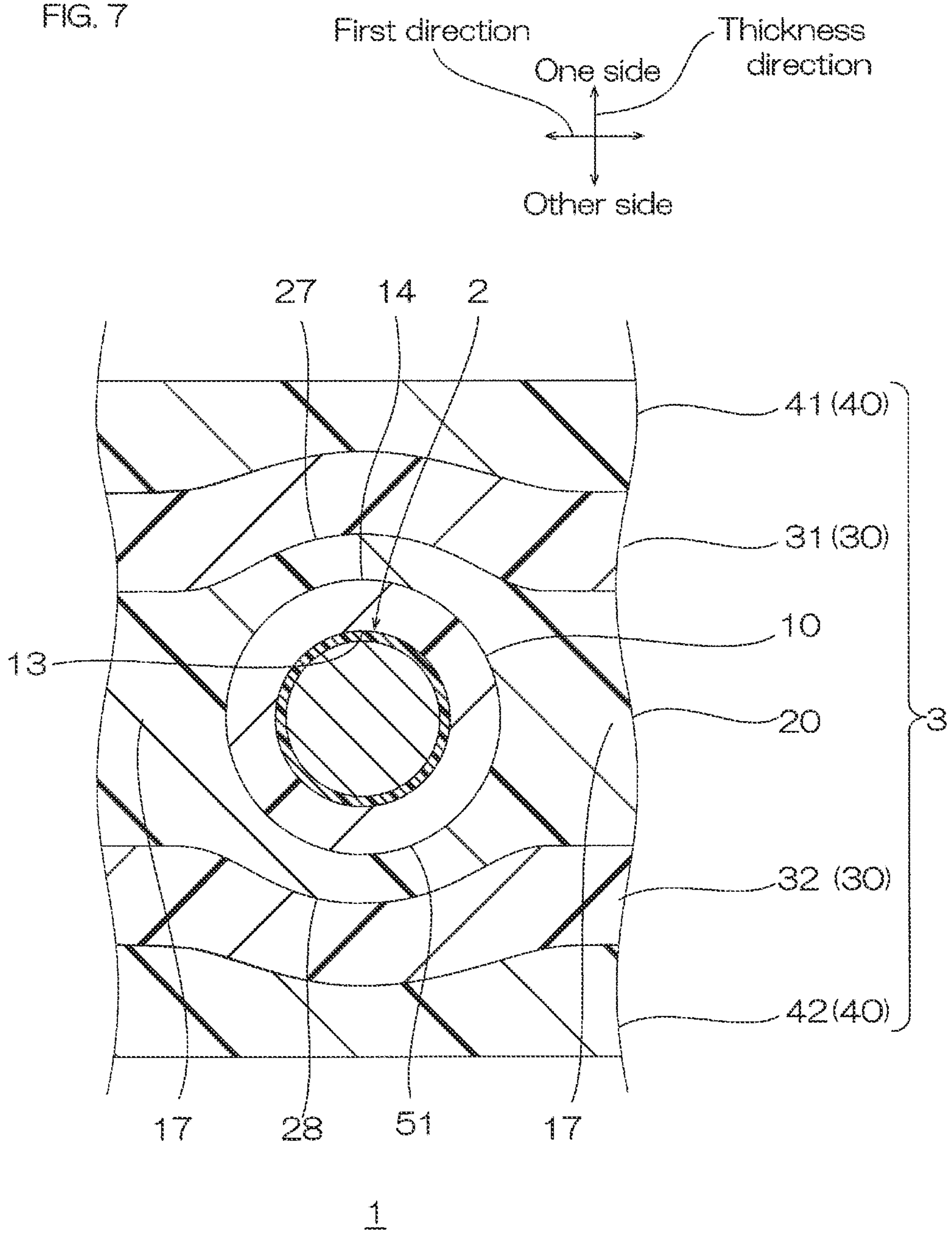
FIG. 7 shows a front cross-sectional view of a modified example (modified example in which a second layer includes an extending portion) of the inductor shown in FIG. 1.

As shown in FIG. 7, the first layer 10 has a generally circular ring shape in a cross-sectional view. The first layer 10 has the inner peripheral surface 13, and an outer peripheral surface 14 located outwardly in the radial direction with respect to the inner peripheral surface 13.

The second layer 10 has the one-side second are portion 27, the other-side second arc portion 28, and the extending portion 17.

Figure 8:
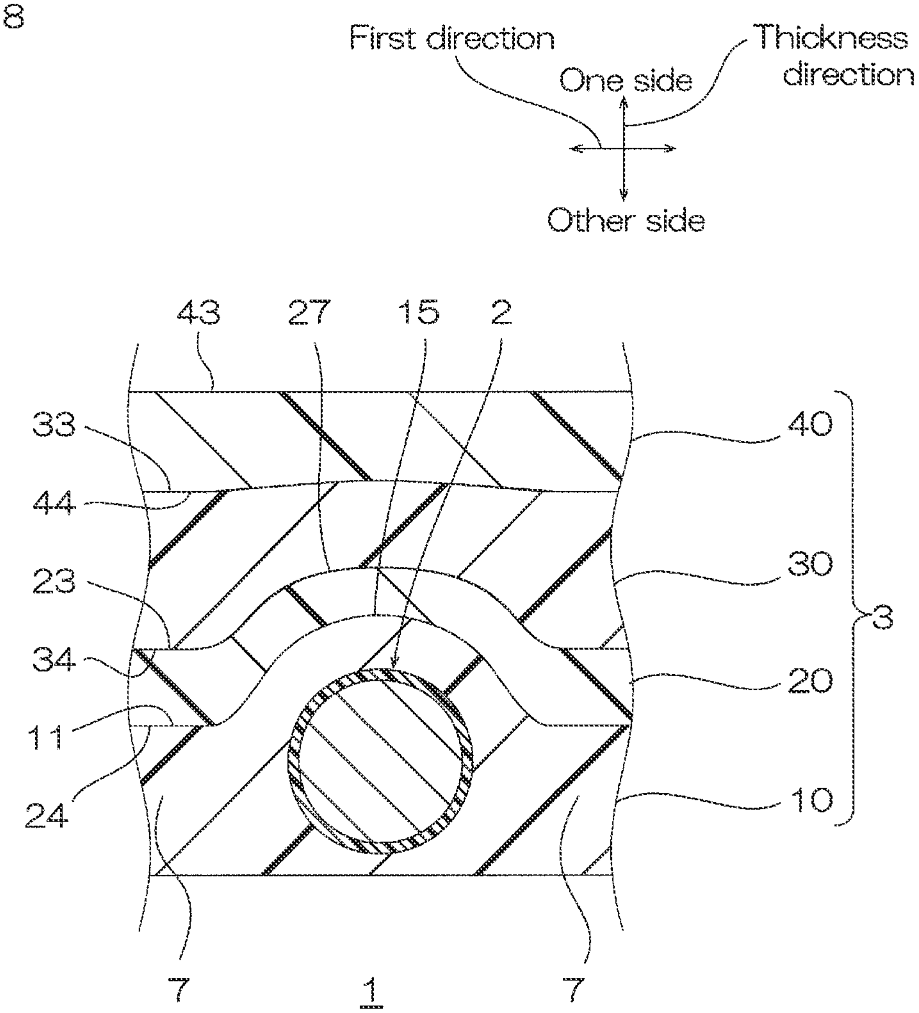
FIG. 8 shows a front cross-sectional view of a modified example (modified example in which each of the first layer to the fourth layer consists of one layer) of the inductor shown in FIG. 1.

As shown in FIG. 8, each of the second layer 20, the third layer 30, and the fourth layer 440 may consist of one layer.

The second layer 20 is disposed on the one surface 11 of the first layer 10. The second layer 20 has the other surface 24 in contact with the one surface 11 of the first layer 10, and the one surface 23 facing the other surface 24.

The third layer 30 is disposed on the one surface 23 of the second layer 20. The third layer 30 has the other surface 34 in contact with the one surface 23 of the second layer 20, and the one surface 33 facing the other surface 34.

The fourth layer 40 is disposed on the one surface 33 of the third layer 30. The fourth layer 40 has the other surface 44 in contact with the one surface 33 of the third laver 30, and the one surface 43 facing the other surface 44.

Further, the third layer 30 may have a generally arc shape in a cross-sectional view.

Then, by appropriately changing the kind, the shape, and the volume ratio of the magnetic particles of each layer in the magnetic layer 3, in the first layer 10, the second layer 20, the third layer 30, and the fourth laser 40, the relative magnetic permeabilities of the layer closer to the wire 2 is set lower than that of the layer farther from the wire 2.

(Specific Embodiment)

In the following, in the first to second embodiments, a specific embodiment in which by changing the kind, the shape, the volume ratio, and the like of the magnetic particles of each layer in the magnetic layer 3, the relative magnetic permeability of the layer closer to the wire 2 is set lower than that of the layer farther from the wire 2 is described with reference to FIGS. 3 to 6.

In FIGS. 1 to 2, the magnetic particles are not drawn, and in FIGS. 3 to 6, the magnetic particles are drawn for easy understanding of the shape of the magnetic particles and the orientation of the second magnetic particles. However, in FIGS. 3 to 6, the shape, the orientation, and the like of the magnetic particles are exaggeratedly drawn.

(First Embodiment)

The inductor 1 of the first embodiment is described with reference to FIGS. 3 to 4.

Figure 3:
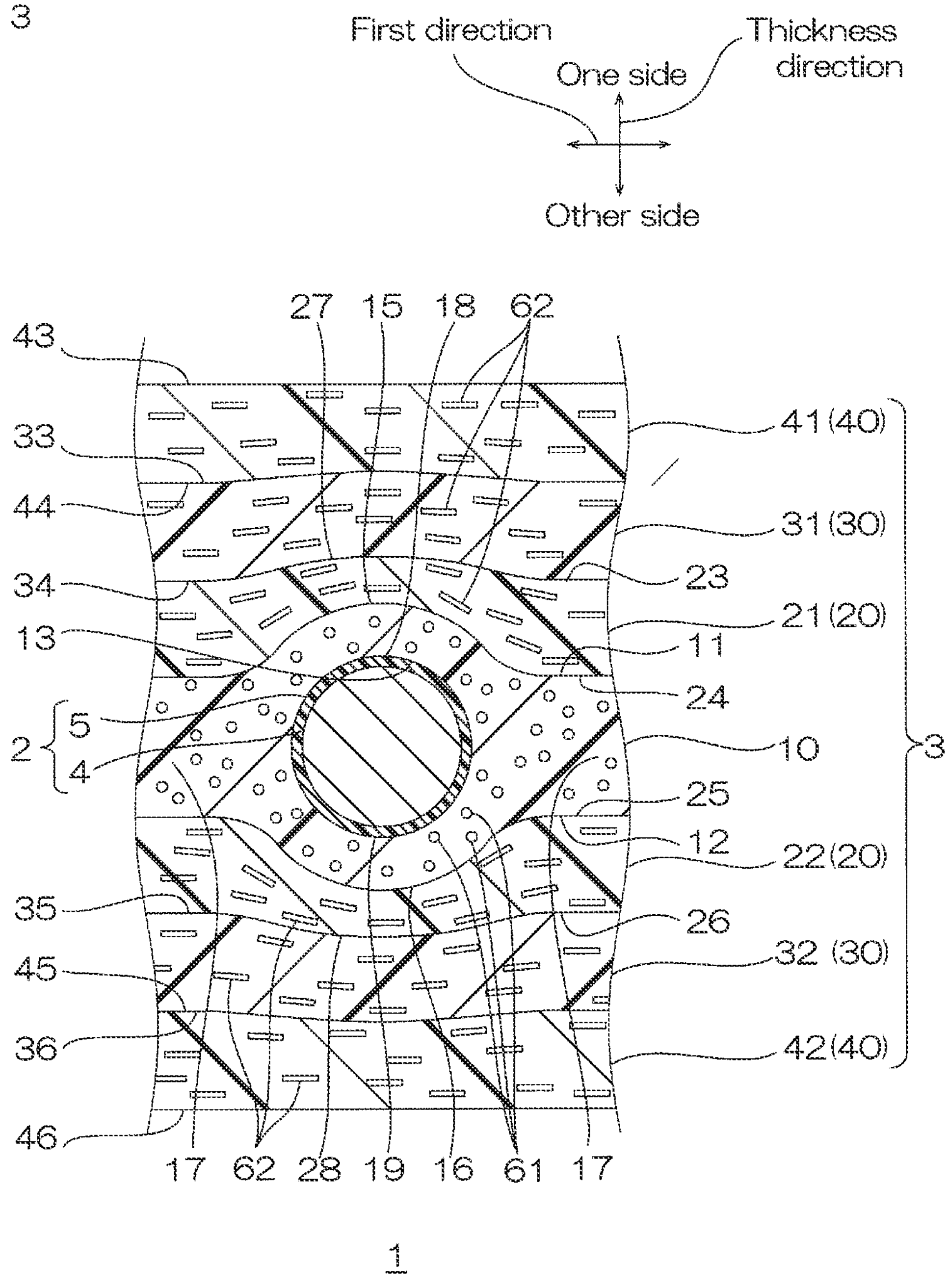
FIG. 3 shows a front cross-sectional view of an inductor corresponding to a first embodiment.

As shown in FIG. 3, in the inductor 1 of the first embodiment, the first layer 10 contains first magnetic particles 61 having a generally spherical shape, and the second laser 20, the third layer 30, and the fourth layer 40 contain second magnetic particles 62 having a generally flat shape.

The first magnetic particles 61 are not orientated, and are uniformly (isotropically) dispersed in the first layer 10. An average particle size of the first magnetic particles 61 is, for example, 0.1 μm or more, preferably 0.5 μm or more, and for example, 100 μm or less, preferably 50 μm or less. As a magnetic material for the first magnetic particles 61, preferably, an iron powder in which an organic iron compound is thermally decomposed is used, more preferably, a carbonyl iron powder (relative magnetic permeability at 10 MHz: for example, 1.1 or more, preferably 3 or more, and for example, 25 or less, preferably 20 or less) is used.

Since the first layer 10 contains the first magnetic particles 61 having a generally spherical shape, the relative magnetic permeability thereof can be reliably set lower than that of the second layer 20 containing the second magnetic particles 62 having a generally flat shape to be described later. Further, in the case of the first magnetic particles 61 having a generally spherical shape, the inductor 1 has excellent inductance. Furthermore, in the case of the first magnetic particles 61 having a generally spherical shape, it is possible to suppress the magnetic saturation.

The second magnetic particles 62 are orientated in a direction along each layer in each of the second layer 20, the third layer 30, and the fourth layer 40.

Specifically, the second magnetic particles 62 are orientated in the circumferential direction of the wire 2 in the one-side second arc portion 27 and the other-side second arc portion 28 of the second layer 20. A case where an angle formed by the plane direction of the second magnetic particles 62 and a tangent in contact with the circumferential surface of the wire 2 facing the inner side in the radial direction of the second magnetic particles 62 is 15 degrees or less is defined that the second magnetic particles 62 are orientated in the circumferential direction.

The second magnetic particles 62 are orientated along the plane direction in the third layer 30 and the fourth layer 40.

An average value of the maximum length of the second magnetic particles 62 is, for example, 3.5 μm or more, preferably 10 μm or more, and for example, 200 μm or less, preferably 150 μm or less.

As a material for the second magnetic particles 62, preferably, a Fe—Si alloy (relative magnetic permeability at 10 MHz 25 or more) is used.

For example, when the kind of the second magnetic particles 62 of the second layer 20, the third layer 30, and the fourth layer 40 is the same, a volume ratio of the second magnetic particles 62 of the second layer 20, the third layer 30, and the fourth layer 40 is adjusted. In this case, the volume ratio of the second magnetic particles 62 in the layer closer to the wire 2 is set lower than that of the second magnetic particles 62 in the layer farther from the wire 2.

In addition, when the volume ratio of the second magnetic particles 62 of the second layer 20, the third layer 30, and the fourth layer 40 is generally the same, the kind of the second magnetic particles 62 of the second layer 20, the third layer 30, and the fourth layer 40 is changed. In this case, the kind of the second magnetic particles 62 is selected so that the relative magnetic permeability of the second magnetic particles 62 in the layer closer to the wire 2 is set lower than that of the second magnetic particles 62 in the layer farther from the wire 2.

It is also possible to change both the volume ratio and the relative magnetic permeability of the second magnetic particles 62.

Figure 4:
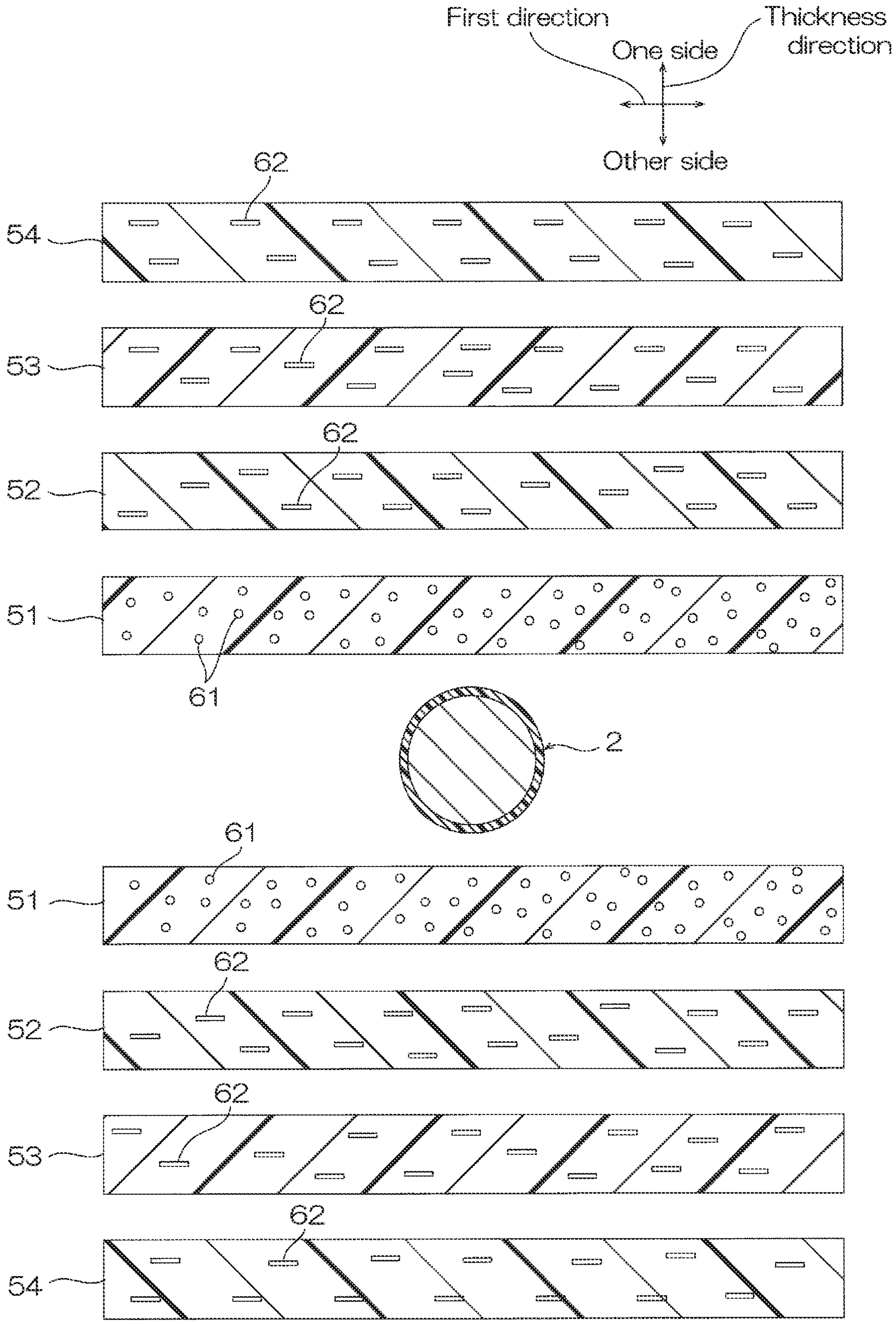
FIG. 4 shows a front cross-sectional view for illustrating a method for producing the inductor shown in FIG. 3.

To produce the inductor 1, as shown in FIG. 4, the first sheet 51 containing the first magnetic particles 61, and the second sheet 52, the third sheet 53, and the fourth sheet 54 containing the second magnetic particles 62 having the same or different relative magnetic permeability at the same or different volume ratio are prepared. The second magnetic particles 62 are orientated in the plane direction in each of the second sheet 52, the third sheet 53, and the fourth sheet 54.

Thereafter, the wire 2 and the above-described first sheet 51 to fourth sheet 54 are thermally pressed.

Then, in the inductor 1, the first layer 10 contains the first magnetic particles 61 in a generally spherical shape, and the second layer 20, the third layer 30, and the fourth layer 40 have the second magnetic particles 62 in a generally flat shape.

Then, the second magnetic particles 62 can be orientated in the circumferential direction in the one-side second arc portion 27 and the other-side second arc portion 28 of the second layer 20, while the first magnetic particles 61 are isotropically disposed in the first layer 10. Therefore, the inductor 1 has both excellent DC superposition characteristics and high inductance.

Further, since the second magnetic particles 62 in a generally flat shape contained in the second layer 20 are orientated in the outer peripheral surface of the wire 2, the inductor 1 has excellent inductance.

(Second Embodiment)

The inductor 1 of the second embodiment is described with reference to FIGS. 5 to 6.

Figure 5:
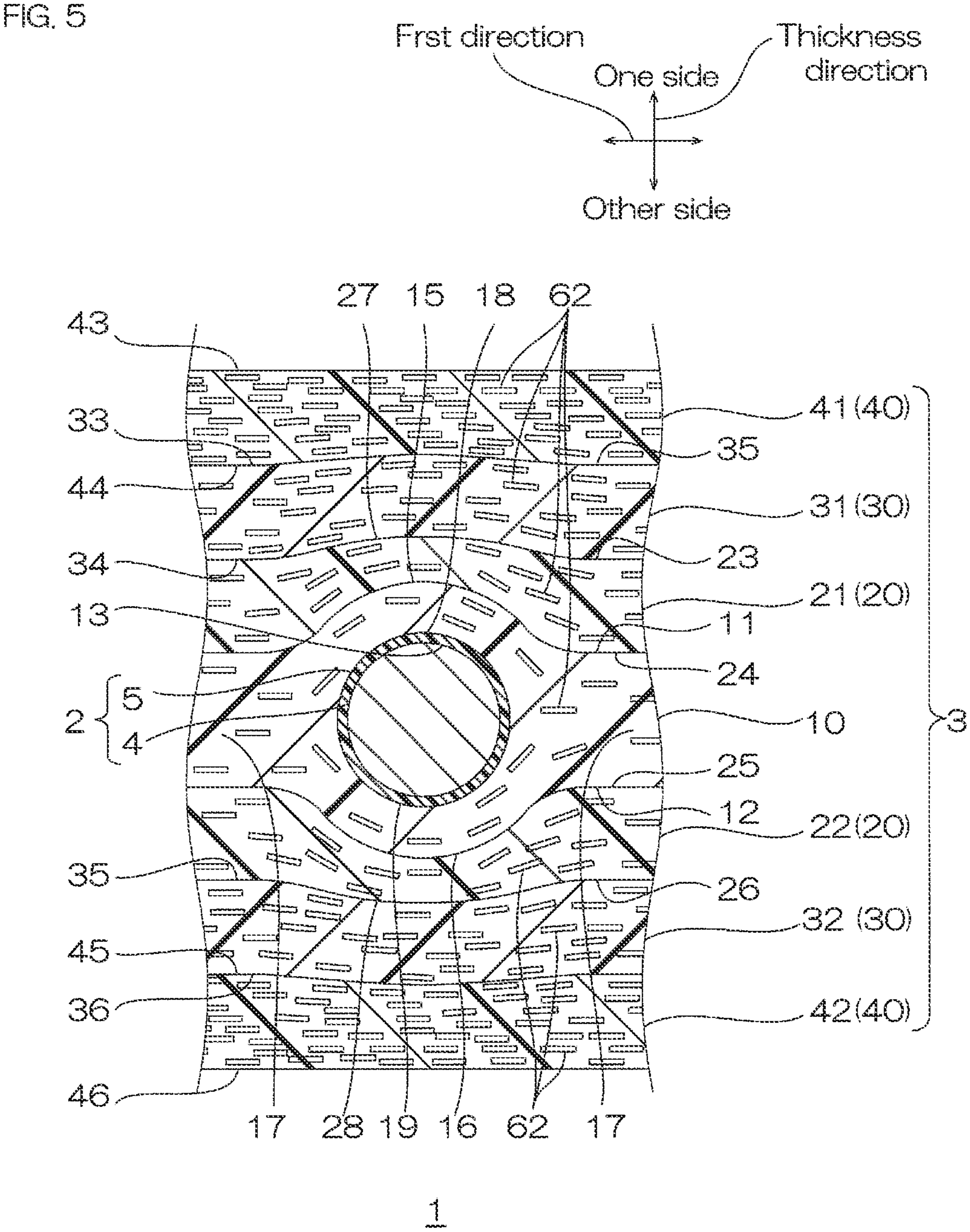
FIG. 5 shows a front cross-sectional view of an inductor corresponding to a second embodiment.

As shown in FIG. 5, in the inductor 1 of the second embodiment, any of the first layer 10, the second layer 20, the third layer 30, and the fourth layer 40 contain the second magnetic particles 62 in a generally flat shape. The second magnetic particles 62 have a generally flat shape. The second magnetic particles 62 are orientated in a direction along each layer in each of the first layer 10, the second layer 20, the third layer 30, and the +40.

Specifically, the second magnetic particles 62 are orientated in the circumferential direction of the wire 2 in the one-side first arc portion 15 and the other-side first arc portion 16 of the first layer 10, while being orientated in the plane direction in the extending portion 17. Further, the second magnetic particles 62 are orientated in the circumferential direction of the wire 2 in the one-side second arc portion 27 and the other-side second arc portion 28. Meanwhile, the second magnetic particles 62 are orientated in the plane direction in the third layer 30 and the fourth layer 40.

For example, when the kind of the second magnetic particles 62 of the first layer 10, the second layer 20, the third layer 30, and the fourth layer 40 is the same, the volume ratio of the second magnetic particles 62 of the first layer 10, the second layer 20, the third layer 30, and the fourth layer 4) is adjusted. In this case, the volume ratio of the second magnetic particles 62 in the layer closer to the wire 2 is set lower than that of the second magnetic particles 62 in the layer farther from the wire 2. Specifically, a ratio of the volume ratio of the second magnetic particles 62 in the first layer 10 to that of the second magnetic particles 62 in the second layer 20 is, for example, below 1, preferably (9 or less, more preferably 0.8 or less, and for example, 0.5 or more, further 0.6 or more. The volume ratio of the second magnetic particles 62 of the third layer 30 and the fourth layer 40 is also the same as the description above.

In addition, when the volume ratio of the second magnetic particles 62 in the first layer 10, the second layer 20, the third layer 30, and the fourth layer 40 is generally the same, the kind of the second magnetic particles 62 of the first layer 10, the second layer 20, the third layer 30, and the fourth layer 40 are changed. In this case, the kind of the second magnetic particles 62 is selected so that the relative magnetic permeability of the second magnetic particles 62 in the laser closer to the wire 2 is lower than that of the second magnetic particles 62 in the layer farther from the w ire 2.

Also, it is possible to employ both a method of changing the volume ratio of the second magnetic particles 62, and a method of changing the relative magnetic permeability of the second magnetic particles 62.

From the viewpoint of a wider width of adjustment of the relative magnetic permeability of the first layer 10 to the fourth layer 40, preferably, a method of changing the relative magnetic permeability of the second magnetic particles 62 is employed as compared with a method of changing the volume ratio of the second magnetic particles 62.

On the other hand, from the viewpoint of ensuring excellent productivity, preferably, a method of changing the volume ratio of the second magnetic particles 62 is employed as compared with a method of changing the relative magnetic permeability of the second magnetic particles 62.

Further, of the first embodiment and the second embodiment, preferably, the first embodiment is used. In the first embodiment, the relative magnetic permeability of the first layer 10 can be reliably and easily lowered than that of the second layer 20 as compared with the second embodiment.

Figure 6:
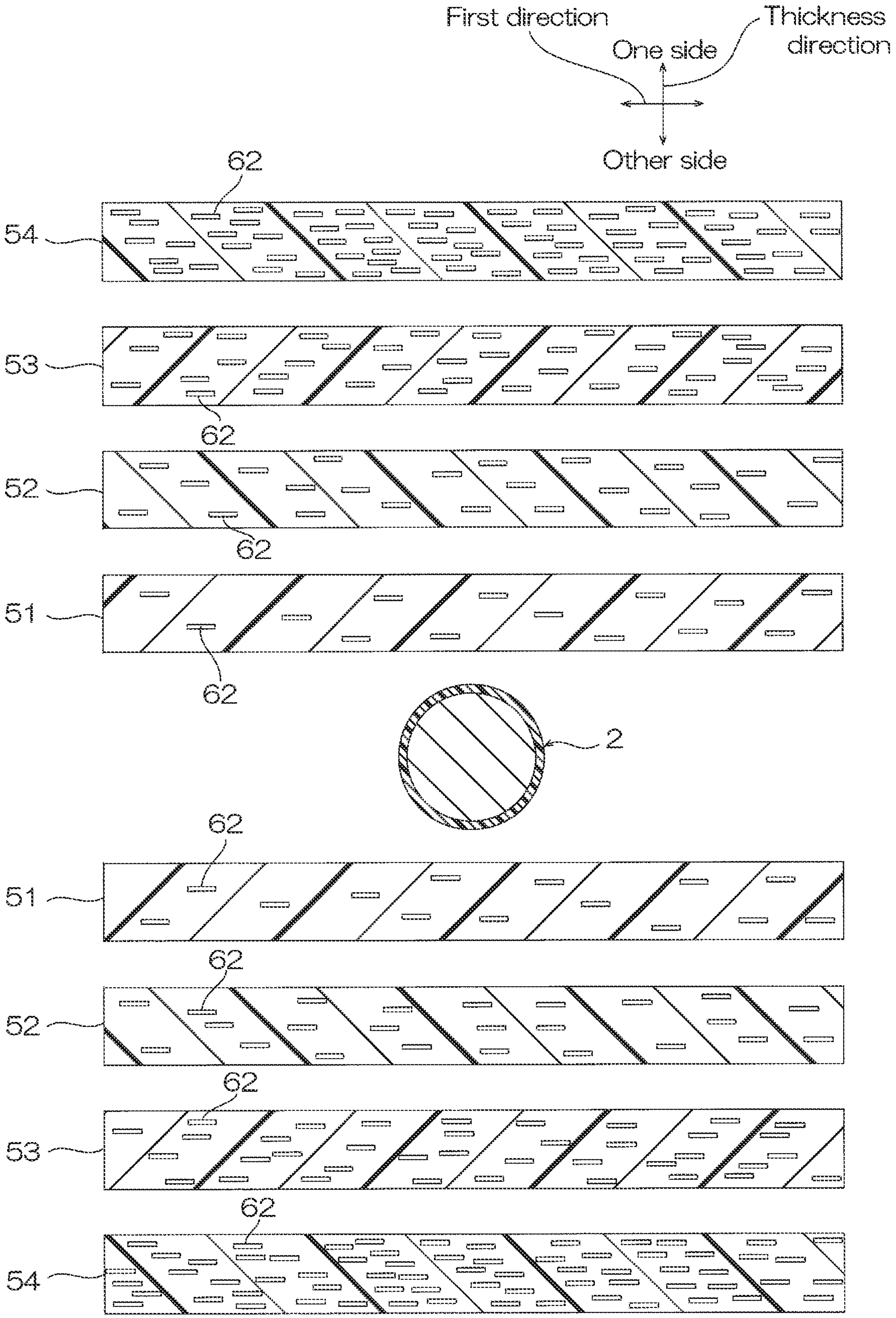
FIG. 6 shows a front cross-sectional view for illustrating a method for producing the inductor shown in FIG. 5.

To produce the inductor 1 of the second embodiment, as shown in FIG. 6, the first sheet 51, the second sheet 52, the third sheet 53, and the fourth sheet 54 containing the second magnetic particles 62 having the same or different relative magnetic permeability at the same or different volume ratio are prepared. The second magnetic particles 62 are orientated in the plane direction in each of the first sheet 51, the second sheet 52, the third sheet 53, and the fourth sheet 54.

Thereafter, the wire 2, and the first sheet 51 to the fourth sheet 54 described above are thermally pressed.

(Further Modified Example)

Although not shown, all of the first layer 10 to the fourth layer 40 may also contain, for example, isotropic magnetic particles, specifically, the first magnetic particles 61 in a generally spherical shape.

EXAMPLES

Next, the present invention is further described based on Examples and Comparative Example below. The present invention is however not limited by these Examples and Comparative Example. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Preparation Example 1

<Preparation of Binder>

A binder was prepared in accordance with the formulation described in Table 1.

Example 1

<Production Example of Inductor Based on First Embodiment>

First, the wire 2 having a radius of 130 μm was prepared. A radius of the conducting line 4 was 115 μm, and a thickness of the insulating film 5 was 15 μm.

The first sheet 51, the second sheet 52, the third sheet 53, and the fourth sheet 54 were fabricated so as to have the kind and the filling ratio of the magnetic particles described in Table 2.

As the first sheet 51, four sheets having a thickness of 60 μm were prepared. As the second sheet 52, eight sheets having a thickness of 130 μm were prepared. As the third sheet 53, eight sheets having a thickness of 60 μm w ere prepared. As the fourth sheet 54, four sheets having a thickness of 100 μm were prepared.

Then, the two fourth sheets 54, the four third sheets 53, the four second sheets 52, the two first sheets 51, the wire 2, the two first sheets 51, the four second sheets 52, the four third sheets 53, and the two fourth sheets 54 were disposed in order toward one side in the thickness direction.

Subsequently, they were thermally pressed using a flat plate press, thereby forming the magnetic layer 3.

Thus, the inductor 1 including the wire 2, and the magnetic layer 3 embedding the wire 2 was produced A thickness of the inductor 1 was 975 μm.

Example 2 to Comparative Example 1

The inductor 1 was produced in the same manner as in Example 1, except that the formulation of the magnetic sheet was changed in accordance with Tables 3 to 6.

The inductor 1 of Example 2 corresponded to the second embodiment (specifically, the embodiment of changing the kind of the magnetic particles of each layer in the magnetic layer).

Further, the inductor 1 of Example 3 corresponded to the second embodiment (specifically, the embodiment of changing the content ratio (filling ratio) of the magnetic particles of each layer in the magnetic layer).

Further, the inductor 1 of Example 4 is the second embodiment, and the embodiment of changing both the kind and the content ratio (filling ratio) of the magnetic particles of each layer in the magnetic layer.

<Evaluation>

The following items are evaluated, and the results are described in Tables 2 to 7.

<Relative Magnetic Permeability>

The relative magnetic permeability of each of the first sheets 51 of Example 1 to Comparative Example 1, each of the second sheets 52 of Examples 1 to 4, each of the third sheets 53 of Examples 1 to 4, and each of the fourth sheets 54 of Examples 1 and 3 was measured with an impedance analyzer (manufactured by Agilent Technologies Japan, Ltd.: "4291B") using a magnetic material test fixture.

<DC Superposition Characteristics>

The DC superimposition characteristics were evaluated by measuring a reduction ratio of inductance by flowing an electric current of 10 A to the conducting line 4 of the inductor 1 of Example 1 to Comparative Example 1 using an impedance analyzer (manufactured by Kuwaki Electronics, Co., Ltd., "65120B") installed with a DC bias test fixture and a DC bias power supply.

The reduction ratio of inductance was calculated based on the following formula.

[Inductance in a state where no DC bias current is applied−Inductance in a state where DC bias current is applied]/[Inductance in a state where DC bias current is applied]×100(%)

TABLE 1

| Formulation of Binder | | | Preparation Ex. 1 |
|---|---|---|---|
| Thermoplastic Component | Carboxyl Group-Containing Acrylic Acid Ester Copolymer | TEISANRESIN SG-70LN Manufactured by Nagase ChemteX Corporation | 18.7 |
| Thermosetting Component (Epoxy Resin Composition) | Cresol Novolak-type Epoxy Resin (Main agent) | EPICLON N-665-EXP-S Manufactured by DIC Corporation | 9.7 |
| | Phenol Resin (Curing Agent) | MEHC-7851SS Manufactured by MEIWA PLASTIC INDUSTRIES LTD. | 9.7 |
| | Imidazole Compound (Curing Accelerator) | 2PHZ-PW Manufactured by SHIKOKU CHEMICAL CORPORATION | 0.3 |

Numerical Value: % by volume

TABLE 2

| Ex. 1 | | Magnetic Layer: Relative Magnetic Permeability | Magnetic Layer: Thickness of Each Magnetic Sheet (μm) | Reduction Ratio of Inductance (%) | Magnetic Particles: Shape | Magnetic Particles: Neutral Particle Size [μm] | Magnetic Particles: Kind | Magnetic Particles: Filling Ratio (% by volume) |
|---|---|---|---|---|---|---|---|---|
| Magnetic Sheet | First Sheet | 7.9 | 60 | 18.0 | Spherical | 1.5 | Carbonyl Iron Powder | 57 |
| | Second Sheet | 27.7 | 130 | | Flat | 50 | Fe—Si Alloy | 49 |
| | Third Sheet | 66.6 | 60 | | Flat | 38 | Fe—Si Alloy | 59 |
| | Fourth Sheet | 101.6 | 100 | | Flat | 38 | Mixture of Fe—Si Alloy/ Sendust (1:1) | 57 |

| | | Number of Magnetic Sheet Used for Production | | | R (ratio)*A | | D (%)*B | |
|---|---|---|---|---|---|---|---|---|
| Magnetic Sheet | First Sheet | 4 | One side | 2 | R1 | 0.29 | D1 | 20 |
| | | | Other side | 2 | | | | |
| | Second Sheet | 8 | One side | 4 | R2 | 0.42 | D2 | 39 |
| | | | Other side | 4 | | | | |
| | Third Sheet | 8 | One side | 4 | R3 | 0.66 | D3 | 35 |
| | | | Other side | 4 | | | | |
| | Fourth Sheet | 4 | One side | 2 | — | | — | |
| | | | Other side | 2 | | | | |

*A R1 = Relative Magnetic Permeability of First Sheet/Relative Magnetic Permeability of Second Sheet
R2 = Relative Magnetic Permeability of Second Sheet/Relative Magnetic Permeability of Third Sheet
R3 = Relative Magnetic Permeability of Third Sheet/Relative Magnetic Permeability of Fourth Sheet

*B D1 = Relative Magnetic Permeability of Second Sheet − Relative Magnetic Permeability of First Sheet
D2 = Relative Magnetic Permeability of Third Sheet − Relative Magnetic Permeability of Second Sheet
D3 = Relative Magnetic Permeability of Fourth Sheet − Relative Magnetic Permeability of Third Sheet

TABLE 3

| Ex. 2 | | Magnetic Layer: Relative Magnetic Permeability | Magnetic Layer: Thickness of Each Magnetic Sheet (μm) | Reduction Ratio of Inductance (%) | Magnetic Particles: Shape | Magnetic Particles: Neutral Particle Size [μm] | Magnetic Particles: Kind | Magnetic Particles: Filling Ratio (% by volume) |
|---|---|---|---|---|---|---|---|---|
| Magnetic Sheet | First Sheet | 27.7 | 130 | 35.5 | Flat | 50 | Fe—Si Alloy | 49 |
| | Second Sheet | 66.6 | 60 | | Flat | 38 | Fe—Si Alloy | 59 |
| | Third Sheet | 101.6 | 100 | | Flat | — | Mixture of Fe—Si Alloy/ Sendust (1:1) | 57 |

| | | Number of Magnetic Sheet Used for Production | | | R (ratio)*A | | D (%)*B | |
|---|---|---|---|---|---|---|---|---|
| Magnetic Sheet | First Sheet | 8 | One side | 4 | R1 | 0.29 | D1 | 20 |
| | | | Other side | 4 | | | | |
| | Second Sheet | 8 | One side | 4 | R2 | 0.42 | D2 | 39 |
| | | | Other side | 4 | | | | |
| | Third Sheet | 4 | One side | 2 | — | | — | |
| | | | Other side | 2 | | | | |

*A R1 = Relative Magnetic Permeability of First Sheet/Relative Magnetic Permeability of Second Sheet
R2 = Relative Magnetic Permeability of Second Sheet/Relative Magnetic Permeability of Third Sheet

*B D1 = Relative Magnetic Permeability of Second Sheet − Relative Magnetic Permeability of First Sheet
D2 = Relative Magnetic Permeability of Third Sheet − Relative Magnetic Permeability of Second Sheet

TABLE 4

| Ex. 3 | | Magnetic Layer: Relative Magnetic Permeability | Magnetic Layer: Thickness of Each Magnetic Sheet (μm) | Magnetic Layer: Reduction Ratio of Inductance (%) | Magnetic Particles: Shape | Magnetic Particles: Kind | Magnetic Particles: Filling Ratio (% by volume) |
|---|---|---|---|---|---|---|---|
| Magnetic Sheet | First Sheet | 70.0 | 60 | 58.6 | Flat | Sendust | 30 |
| | Second Sheet | 93.3 | 60 | | Flat | Sendust | 40 |
| | Third Sheet | 116.7 | 85 | | Flat | Sendust | 50 |
| | Fourth Sheet | 140.0 | 85 | | Flat | Sendust | 60 |

| | | Number of Magnetic Sheet Used for Production | | | R (ratio)*A | | D (%)*B | |
|---|---|---|---|---|---|---|---|---|
| Magnetic Sheet | First Sheet | 4 | One side | 2 | R1 | 0.29 | D1 | 20 |
| | | | Other side | 2 | | | | |
| | Second Sheet | 8 | One side | 4 | R2 | 0.42 | D2 | 39 |
| | | | Other side | 4 | | | | |
| | Third Sheet | 8 | One side | 4 | R3 | 0.66 | D3 | 35 |
| | | | Other side | 4 | | | | |
| | Fourth Sheet | 4 | One side | 2 | — | | — | |
| | | | Other side | 2 | | | | |

*A R1 = Relative Magnetic Permeability of First Sheet/Relative Magnetic Permeability of Second Sheet
R2 = Relative Magnetic Permeability of Second Sheet/Relative Magnetic Permeability of Third Sheet
R3 = Relative Magnetic Permeability of Third Sheet/Relative Magnetic Permeability of Fourth Sheet

*B D1 = Relative Magnetic Permeability of Second Sheet − Relative Magnetic Permeability of First Sheet
D2 = Relative Magnetic Permeability of Third Sheet − Relative Magnetic Permeability of Second Sheet
D3 = Relative Magnetic Permeability of Fourth Sheet − Relative Magnetic Permeability of Third Sheet

TABLE 5

| Ex. 4 | | Magnetic Layer: Relative Magnetic Permeability | Magnetic Layer: Thickness of Each Magnetic Sheet (μm) | Magnetic Layer: Reduction Ratio of Inductance (%) | Magnetic Particles: Shape | Magnetic Particles: Neutral Particle Size [μm] | Magnetic Particles: Kind | Magnetic Particles: Filling Ratio (% by volume) |
|---|---|---|---|---|---|---|---|---|
| Magnetic Sheet | First Sheet | 12.5 | 55 | 19.6 | Spherical | — | Carbonyl Iron Powder | 61 |
| | Second Sheet | 43.4 | 55 | | Flat | 40 | Fe—Si Alloy | 44 |
| | Third Sheet | 54.1 | 95 | | Flat | 40 | Fe—Si Alloy | 57 |

| | | Number of Magnetic Sheet Used for Production | | | R (ratio)*A | | D (%)*B | |
|---|---|---|---|---|---|---|---|---|
| Magnetic Sheet | First Sheet | 8 | One side | 4 | R1 | 0.29 | D1 | 31 |
| | | | Other side | 4 | | | | |
| | Second Sheet | 4 | One side | 2 | R2 | 0.80 | D2 | 11 |
| | | | Other side | 2 | | | | |
| | Third Sheet | 8 | One side | 4 | — | | — | |
| | | | Other side | 4 | | | | |

*A R1 = Relative Magnetic Permeability of First Sheet/Relative Magnetic Permeability of Second Sheet
R2 = Relative Magnetic Permeability of Second Sheet/Relative Magnetic Permeability of Third Sheet

*B D1 = Relative Magnetic Permeability of Second Sheet − Relative Magnetic Permeability of First Sheet
D2 = Relative Magnetic Permeability of Third Sheet − Relative Magnetic Permeability of Second Sheet

TABLE 6

| | Magnetic Layer | | | | | | | |
|---|---|---|---|---|---|---|---|---|
| | Relative | Thickness of Each | Reduction Ratio of | Magnetic Particles | | | | |
| Comparative Ex. 1 | Magnetic Permeability | Magnetic Sheet (μm) | Inductance (%) | Shape | Kind | Filling Ratio (% by volume) | Number of Magnetic Sheet Used for Production | |
| Magnetic Sheet | 140 | 85 | 78.5 | Flat | Sendust | 60 | 14 | One Side 7 |
| | | | | | | | | Other Side 7 |

TABLE 7

| | | Ex. 1 | Ex. 2 | Ex. 3 | Ex. 4 | Comparative Ex. 1 |
|---|---|---|---|---|---|---|
| Embodiment | | First | Second*A | Second*B | Third*D | — |
| Thickness | | 975 | 675 | 930 | 805 | 497 |
| Relative Magnetic Permeability | First Sheet | 7.9 | 27.7 | 70 | 12.5 | 140.0 |
| | Second Sheet | 27.7 | 66.6 | 93.3 | 43.4 | |
| | Third Sheet | 66.6 | 101.6 | 116.7 | 54.1 | |
| | Fourth Sheet | 101.6 | — | 140 | — | |
| DC Superposition Characteristics | Reduction Ratio*C of Inductance (%) | 18.0 | 35.5 | 56.6 | 19.4 | 78.5 |

*A Change of kind (relative magnetic permeability) of magnetic particles in first sheet to nth sheet

*B Change of filling ratio of magnetic particles in first sheet to nth sheet $$*^{C}\text{Reduction ratio of inductance} = \frac{\text{(Inductance in a state where no DC bias current is applied)} - \text{(Inductance in a state where DC bias current is applied)}}{\text{(Inductance in a state where DC bias current is applied)}}$$

*D Change of kind and filling ratio of magnetic particles in first sheet to nth sheet While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The inductor of the present invention is loaded on an electronic device and the like.

DESCRIPTION OF REFERENCE NUMERALS

1 Inductor
2 Wire
3 Magnetic layer
4 Conducting line
5 Insulating film
10 First layer
20 Second layer
30 Third layer
40 Fourth layer
17 Extending portion
61 First magnetic particles (magnetic particles in spherical shape)
62 Second magnetic particles (magnetic particles in flat plate shape)

The invention claimed is:

1. An inductor comprising:

a wire including a conducting line, and an insulating film disposed on an entire circumferential surface of the conducting line, and a magnetic layer embedding the wire, wherein the magnetic layer contains a magnetic particle, the magnetic layer includes a first layer in contact with the circumferential surface of the wire, a second layer in contact with the surface of the first layer, and the n-th layer (n is a positive number of 3 or more) in contact with the surface of the (n−1)th layer, and in the two layers adjacent to each other in the magnetic layer, the relative magnetic permeability of the layer closer to the wire is lower than the relative magnetic permeability of the layer farther from the wire.

2. The inductor according to claim 1, wherein the wire has a generally circular shape in a cross-sectional view.

3. The inductor according to claim 2, wherein any of the second layer to the n-th layer has a generally arc shape in a cross-sectional view sharing a center with the wire.

4. The inductor according to claim 1, wherein any of the first layer to the n-th layer has an extending portion extending from the wire in a direction perpendicular to an extending direction of the wire and a thickness direction of the magnetic layer.

5. The inductor according to claim 1, wherein the magnetic particle contained in the first layer has a generally spherical shape, and the magnetic particle contained in the second layer to the n-th layer has a generally flat shape.

6. The inductor according to claim 1, wherein the magnetic particle contained in at least the second layer is orientated in an outer peripheral surface of the wire.

* * * * *